Patented Sept. 16, 1952

2,610,951

UNITED STATES PATENT OFFICE 2,610,951

METHOD OF HEAT-TREATING A SWELLABLE BENTONITE TO INCREASE ITS THICKENING POWER

Francis E. Hutchins, East Norwalk, and Cleo J. Golding, South Norwalk, Conn., assignors to R. T. Vanderbilt Co., Inc.

No Drawing. Application August 17, 1950, Serial No. 180,077

3 Claims. (Cl. 252—317)

This invention relates to a method for enhancing the capacity of a swellable bentonite to increase the viscosity of aqueous dispersions thereof.

Bentonite is a clay-like mineral which is noted for its very fine grain size, its high absorptive properties and its high plasticity. As a result, it has found application as a suspending, thickening and paste-forming agent in a wide variety of aqueous compositions, including cosmetic, pharmaceutical and industrial suspensions and emulsions. In the copending application of William K. Feustel and Francis E. Hutchins, Serial No. 765,804, filed August 2, 1947, now United States Patent No. 2,523,204, there is described a bentonite composition which is particularly useful in the manufacture of various aqueous preparations. This composition is composed of an intimate admixture of fine, grit-free constituents of a high gel magnesium bentonite, a high gel aluminum bentonite, and a medium gel aluminum bentonite in the proportions of from 5 to 15 parts by weight of the magnesium bentonite, from 20 to 60 parts by weight of the high gel aluminum bentonite and from 30 to 70 parts by weight of the medium gel aluminum bentonite. The composition is free of particles which are sufficiently coarse to make the composition gritty.

When using bentonite as a viscosity increasing or thickening agent, it is desirable to use as little as possible, in order to decrease the cost of the final mixture. We have discovered a method whereby this can be accomplished, the method being a procedure whereby the thickening power of a bentonite in powder or flake form can be increased. This procedure comprises maintaining the bentonite, when containing absorbed water, at a somewhat elevated temperature until the desired increase in thickening power has taken place.

The following examples illustrate in detail the practice of the present invention. In these examples, viscosities are measured in Brabender units.

Example I

A sample of a commercially available Wyoming bentonite was dispersed in water, drum dried and the dried material flaked. A 3.8% by weight aqueous dispersion of a portion of the flakes had an immediate viscosity of 210. The remaining flakes were maintained at a temperature of 50° C. for a period of time. At the end of eight days, the flakes contained 3.4% by weight of moisture and a 3.8% by weight aqueous dispersion of a portion of the flakes had a viscosity of 250. At the end of seventeen days, the flakes contained 3.0% by weight of moisture and a 3.8% by weight aqueous dispersion of a portion of the flakes had a viscosity of 270.

Example II

A sample of a commercially available bentonite was dispersed in water using a ball mill to form a dispersion containing 12% by weight of solids. This dispersion was centrifuged at a centrifugal force of about one thousand times that of gravity in such a manner that 72% by weight of the bentonite taken passed through the screen together with the water, while the remainder of the bentonite was retained in the basket of the centrifuge. The aqueous dispersion containing 72% by weight of the bentonite taken was then drum dried and the dried bentonite flaked.

A 4.1% by weight aqueous dispersion of a portion of the flakes had an immediate viscosity of 230. The remaining flakes were maintained at a temperature of 50° C. for a period of thirty-five days. At the end of eight days, the flakes contained 3.4% by weight of moisture and a 4.1% by weight aqueous dispersion of a portion thereof had a viscosity of 310. At the end of thirty-five days, the flakes contained 0.4% by weight of moisture and a 4.1% by weight aqueous dispersion of a portion thereof had a viscosity of 305.

Example III

A sample of Roberts bentonite was dispersed in water and the dispersion centrifuged as described in Example II. In this case, however, 76% by weight of the sample taken was recovered and formed into flakes.

A 5.0% by weight aqueous dispersion of a portion of the flakes had an immediate viscosity of 160. The remaining flakes were maintained at a temperature of 50° C. At the end of eight days, a 5.1% by weight aqueous dispersion of a portion of the flakes had a viscosity of 220. At the end of thirty-five days, the flakes contained 3.0% by weight of moisture and a 5.0% by weight aqueous dispersion of a portion of the flakes had a viscosity of 245.

Example IV

Using the procedure described in Patent No. 2,523,204, there was prepared a 12% by weight aqueous dispersion of a mixture of bentonites, the bentonites being a high gel magnesium bentonite, a high gel aluminum bentonite and a medium gel aluminum bentonite in the weight ratio of 10:45:45. This dispersion was centrifuged to provide a filtered aqueous gel containing 56.6% by weight of the bentonites taken. This gel was then drum dried and flaked to provide a mixture which was free from particles sufficiently coarse to impart grittiness. The analysis of this mixture, expressed as oxides, was 61.1% by weight of silicon dioxide, 13.7% by weight of magnesium oxide, 9.3% by weight of aluminum oxide, 0.1% by weight of titanium dioxide, 0.9% by weight of ferric oxide, 2.7% by weight of calcium oxide, 2.9% by weight of sodium oxide, 0.3% by weight of potassium oxide, and 1.8% by weight of carbon dioxide. The mixture contained 7.2% by weight of water of combination, was white in color and contained about 8% by weight of moisture.

A 5.0% by weight aqueous dispersion of a portion of the flakes had an immediate viscosity of 155. The remaining flakes were maintained at a temperature of 92° C. for a period of time. At the end of two weeks, the flakes contained 1.0% by weight of moisture and a 5.0% by weight aqueous dispersion of a portion thereof had a viscosity of 585. At the end of four weeks, the flakes contained 0.5% by weight of moisture and a 5.0% by weight aqueous dispersion of a portion thereof had a viscosity of 625.

Example V

A batch of flakes was prepared in the manner described in Example IV but in this case the recovery from the centrifuging operation was 61.0% by weight.

A 5.0% by weight aqueous dispersion of a portion of the flakes had an immediate viscosity of 130. The remaining flakes were maintained at a temperature of 50° C. for a period of eight weeks. At the end of one week, the flakes contained 3.5% by weight of moisture and a 5.0% by weight aqueous dispersion of a portion thereof had a viscosity of 315. At the end of two weeks, the flakes contained 2.9% by weight of moisture and a 5.0% by weight aqueous dispersion had a viscosity of 380. At the end of eight weeks, the flakes contained 2.9% by weight of moisture and a 5.0% by weight aqueous dispersion had a viscosity of 690.

Example VI

A batch of flakes was prepared in the manner described in Example IV, but in this case, the recovery after the centrifuging operation was 62.5% by weight.

A 5.0% by weight aqueous dispersion of a portion of the flakes had an immediate viscosity of 160. The remaining flakes were maintained at a temperature of 42° C. for a period of eight weeks. At the end of one week, the flakes contained 6.5% by weight of moisture and a 5.0% by weight aqueous dispersion had a viscosity of 270. At the end of two weeks, the flakes contained 6.3% by weight of moisture and a 5.0% by weight aqueous dispersion had a viscosity of 295. At the end of eight weeks, the flakes contained 4.8% by weight of moisture and a 5.0% by weight aqueous dispersion had a viscoity of 355.

Various modifications can be made in the specific procedures described, as will be apparent to those skilled in the art. In practicing the present process, it is critical, however, that the bentonite subjected to the aging treatment at the somewhat elevated temperature contain absorbed moisture, preferably in the amount of at least 0.5% by weight, based upon the weight of the bentonite. The upper limit of moisture content is not critical, so long as the bentonite remains in the form of flakes or powder. As the specific examples illustrate, increased temperatures result in an increase at which the thickening power takes place, and therefore temperatures of at least about 40° C. should be used for the aging, temperatures of 50 to 100° C. being preferred. The aging should be carried out for a period of time sufficient to effect a substantial increase in the thickening power of the bentonite, and this usually requires at least about one week.

As the examples illustrate, the method described is useful for the purpose of increasing the thickening power of the bentonite mixture described in Patent No. 2,523,204. This mixture is free of particles substantially coarse to impart grittiness and contains from 5 to 15 parts by weight of high gel magnesium bentonite, 20 to 60 parts by weight of high gel aluminum bentonite and 30 to 70 parts by weight of medium gel aluminum bentonite.

We claim:

1. A process for increasing the thickening power of a swellable bentonite when incorporated into aqueous dispersions, the said method comprising maintaining the bentonite in flake or powder form at a temperature of at least about 40° C. and not more than about 100° C. for a period of at least one week while the bentonite contains absorbed water.

2. A method as in claim 1 in which the bentonite contains at least about 0.5% by weight of moisture.

3. A method as in claim 1 in which the bentonite is an intimate admixture of fine, grit-free constituents of a high gel magnesium bentonite, a high gel aluminum bentonite and a medium gel aluminum bentonite in the proportions of from 5 to 15 parts by weight of the magnesium bentonite, from 20 to 60 parts by weight of the high gel aluminum bentonite and from 30 to 70 parts by weight of the medium gel aluminum bentonite.

FRANCIS E. HUTCHINS.
CLEO J. GOLDING.

REFERENCES CITED

The following references are of record in the file of this patent:

UNITED STATES PATENTS

| Number | Name | Date |
|---|---|---|
| 1,907,690 | Wait | May 9, 1933 |

OTHER REFERENCES

Mellor: "Comprehensive Treatise on Inorganic and Theoretical Chemistry," vol. 6, p. 495, London, Longmans, Green & Co., 1925.

Davis et al.: "Bentonite: Its Properties, Mining Preparation, Utilization," U. S. Dept. of Interior, Bur. of Mines, Technical Paper 609, U. S. Gov. Printing Office, 1940, pp. 15–21.